United States Patent [19]

Dao

[11] Patent Number: 5,506,953
[45] Date of Patent: Apr. 9, 1996

[54] MEMORY MAPPED VIDEO CONTROL REGISTERS

[75] Inventor: Giang H. Dao, Houston, Tex.

[73] Assignee: Compaq Computer Corporation, Houston, Tex.

[21] Appl. No.: 361,886

[22] Filed: Dec. 22, 1994

Related U.S. Application Data

[63] Continuation of Ser. No. 62,294, May 14, 1993, abandoned.
[51] Int. Cl.[6] ........................................ G06F 12/06
[52] U.S. Cl. ........................ 395/166; 395/401; 395/412
[58] Field of Search .................... 395/162–166, 395/400, 425, 401, 410, 412; 345/185, 190, 200, 203, 27, 28; 365/230.01, 230.06

[56] References Cited

U.S. PATENT DOCUMENTS

| | | | |
|---|---|---|---|
| 4,908,748 | 3/1990 | Pathak | 395/400 |
| 5,201,055 | 4/1993 | Izquierdo et al. | 395/400 |
| 5,210,850 | 5/1993 | Kelly et al. | 395/425 |

*Primary Examiner*—Kee Mei Tung
*Attorney, Agent, or Firm*—Vinson & Elkins

[57] ABSTRACT

A video controller uses memory-mapping to address registers in the video controller to enhance speed of the computer system. The memory-map registers may be mapped to a high address area located within the address space of the frame buffer or to a low address area below one megabyte.

6 Claims, 1 Drawing Sheet

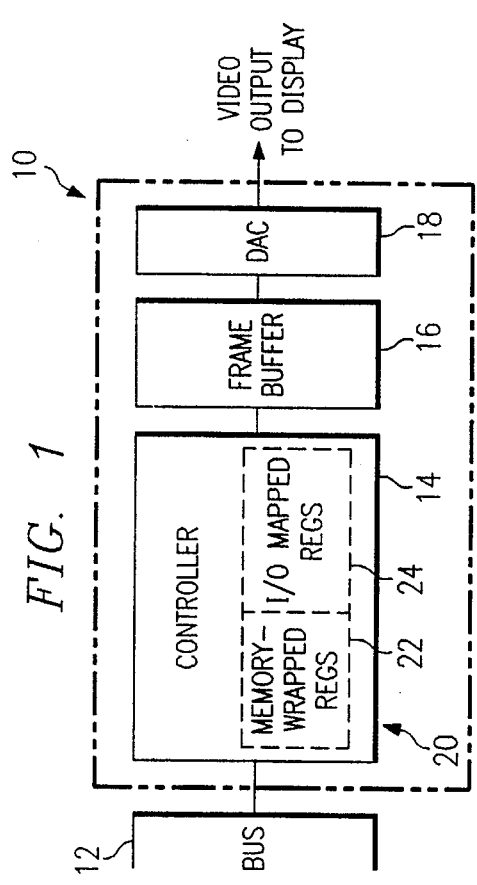
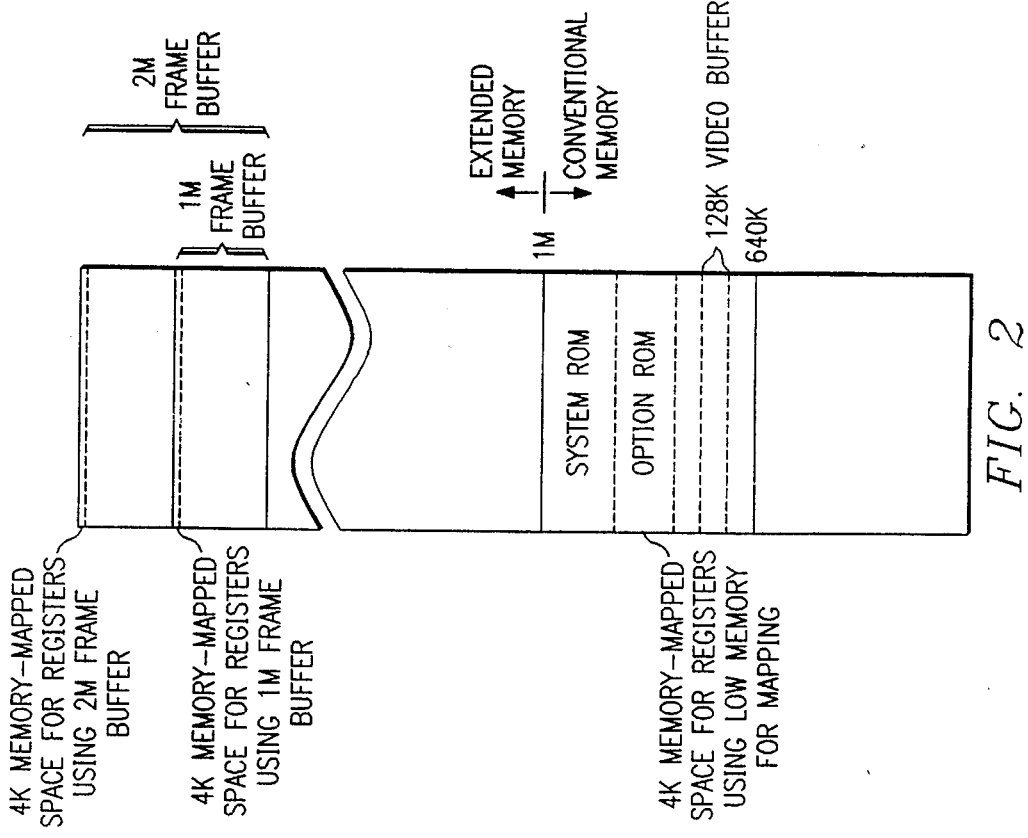
FIG. 1
FIG. 2
FIG. 3

MEMORY MAPPED VIDEO CONTROL REGISTERS

RELATED APPLICATIONS

This application is a Continuation of application Ser. No. 08/062,294, filed May 14, 1993, and entitled "Memory Video Control Registers", now abandoned.

TECHNICAL FIELD OF THE INVENTION

The present invention relates in general to computers, and more particularly to a video controller for a computer.

BACKGROUND OF THE INVENTION

Video controllers are used to translate digital video information generated by a computer into a signal for driving a display, such as a monitor or an LCD screen. Video controllers generate images at predetermined resolutions using a predetermined number of colors. Increasingly, users are demanding more colors and higher resolutions. Other considerations being equal, increasing resolution and/or the number of colors negatively impacts the speed at which a video controller can generate an image signal.

The popularity of graphical user interfaces (GUIs), such as Windows and OS/2, has both increased the users' desire for higher resolution, more colors and greater speed. Consequently, many video controllers provide features for increasing the speed at which video data may be processed in a GUI environment. Programs ("drivers") are provided along with the video controller hardware to allow the GUI (or other program) to take advantage of the accelerated features of the video controller.

Each video controller uses a large number of registers to control its operation. Some of these registers are dictated by the video standard being used; for example, the VGA specification dictates a number of registers which must be provided by VGA video controller, such that a program which supports VGA can anticipate the availability of these registers in generating the VGA output. Other registers are specific to enhanced features provided in the particular implementation of the video controller. These registers are accessed only by specific programs to which the manufacturer (or a third party) has written a driver to use the functions provided by these additional registers.

Communicating with a video controller's registers is typically performed through a I/O-mapped read/write cycle. For processors in the INTEL X86 family of microprocessors, an I/O cycle involves setting the M/IO# pin of the processor to a "0" and generating an address on address pins A0–15. Each peripheral which communicates via an I/O-mapped access cycle is assigned a portion of the 64K byte address space provided by the sixteen address bits. The peripherals monitor the M/IO# pin and the address pins to determine whether an I/O cycle is within their address space.

I/O-mapped cycles have certain disadvantages which slow operation of the computer and video controller. Each time an I/O output instruction is issued, the processor's execution is halted until the I/O operation is complete. Thus, the processor waits until completion of the I/O-mapped access, even though the next operation to be performed by the processor may be completely isolated from the I/O operation performed. Further, processors using an execution pipeline (the Intel 80486 has a 4-deep execution buffer) flush the pipeline in a response to an I/O-mapped instruction.

On the other hand, a memory output instruction (i.e., a read/write operation to system memory) can be buffered in the execution pipeline and executed in parallel with subsequent processor instructions. Further, the memory output instructions do not interfere with operating systems such as UNIX and OS/2, in which accessing I/O in a protected mode environment is sometimes not possible.

At least one manufacturer uses memory-mapped register transfers to enhance performance. However, to perform the memory-mapped register accesses, 64K of address space is required just for the memory-mapped registers. This space, in addition to the space for the frame buffer, may significantly reduce the system memory, and requires two address decoders for the registers and frame buffers. Hence, this system is wasteful of both system memory and system address space.

Therefore, a need has arisen in the industry for a video controller having an efficient memory-mapped register addressing method and apparatus.

SUMMARY OF THE INVENTION

In one embodiment of the present invention, a video controller comprises a video memory addressable within a first address range of system memory space for storing video information and a controller for controlling data transfer to the video memory. The controller includes a plurality of registers which are addressable within a second address range of the system memory space. The second address range may be selectively mapped to the first address range or be located in low memory.

The present invention provides significant advantages over the prior art. First, because the registers may be accessed through memory-mapping, the execution of the processor may continue during a data transfer with the registers, thereby increasing system speed. Further, the system memory address space used by the memory-mapped registers may be assigned as a portion of the video memory and, therefore, the memory-mapped registers do not affect the amount of address space available to system memory. Third, the address space of the memory-mapped registers may be set to a location in low (below 1 megabyte) address space, thereby allowing programs which may only access low memory to use the memory-mapped registers.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 illustrates a block diagram of the video controller of the present invention;

FIG. 2 illustrates a memory map showing available locations for the address space used for memory-mapped registers; and FIG. 3 illustrates a block diagram of the decode logic used in the video controller for memory-mapping register addresses.

DETAILED DESCRIPTION OF THE INVENTION

The preferred embodiment of the present invention and its advantages are best understood by referring to FIGS. 1–3 of the drawings, like numerals being used for like and corresponding parts of the various drawings.

FIG. 1 illustrates a block diagram of the video controller 10 of the present invention. The video controller 10 is coupled to the processor over the bus 12. The video controller receives address bits and control signals from the processor over the bus 12. The number of address bits and control signals is dependent upon the processor and bus types. For an ISA bus, there are twenty-four address bits (A23 . . . A0) and for an EISA bus type, there are thirty-two address bits (A31 . . . A0).

The video controller 10 comprises a controller 14, a frame buffer 16 and a digital-to-analog converter (DAC) 18. The controller 14 is responsible for controlling the transfer of video information from the bus 12 to the frame buffer 16. The operation of the controller 14 is controlled in part through values stored in registers 20. In the present invention, both memory-mapped registers 22 and I/O-mapped registers 24 are used.

The use of registers to control the operation of the video controller is well-known in the art; a listing of memory-mapped registers used in the preferred embodiment is provided hereinbelow in connection with Table I.

TABLE I

MEMORY MAPPED REGISTERS

| MEM ADDR | IO ADDR | REGISTER | SIZE | R/W |
|---|---|---|---|---|
| 101 | 385/3D5 | CRTC data | 8-bit | R/W |
| *Graphics configuration and control registers.* | | | | |
| 108 | 3CE | Graphics Index | 8-bit | R/W |
| 109 | 3CF | Graphics data | 8-bit | R/W |
| *Configuration and status registers* | | | | |
| 120 | 63C4/73C4 | Active line counter | 8-bit | R |
| 121 | 63C5/73C5 | Active line counter | 8-bit | R |
| 122 | 3BA3DA | Input status 1 | 8-bit | R |
| 123 | 3CF.10 | Configuration register 1 | 8-bit | R/W |
| *Datepath registers* | | | | |
| 130 | 3C5.02 | Sequencer plane mask | 8-bit | R/W |
| 134 | 3CF.08 | Sequencer bit mask | 8-bit | R/W |
| 138 | 3CF.45 | Page register 0 | 8-bit | R/W |
| 139 | 3CF.46 | Page register 1 | 8-bit | R/W |
| 13A | 3CF.03 | Graphics data rotate | 8-bit | R/W |
| 13B | 3CF.04 | Graphics read plane select | 8-bit | R/W |
| 13C | 63CA/73CA | QVGA Control Register 1 | 8-bit | R/W |
| 13D | 63CB/73CB | QVGA Control Register 3 | 8-bit | R/W |
| 13E | 3CF.5A | Data path control | 8-bit | R/W |
| 140 | 3CF.43 | Foregound color register | 8-bit | R/W |
| 141 | 33C6/53C6 | Background color register | 8-bit | R/W |
| 142 | 33C6/53C6 | Broadcast pattern register | 8-bit | W |
| 143 | 33C7/53C7 | Raster Operation All | 8-bit | W |
| 148 | 33C5/53C5 | Raster Operation 0 | 8-bit | R/W |
| 149 | 33C4/53C4 | Raster Operation 1 | 8-bit | R/W |
| 14A | 33C3/53C3 | Raster Operation 2 | 8-bit | R/W |
| 14B | 33C2/53C2 | Raster Operation 3 | 8-bit | R/W |
| *Line__drawing engine registers* | | | | |
| 160 | 3CF.60 | Line command register | 8-bit | R/W |
| 161 | 3CF.61 | Line pattern pointer | 8-bit | R/W |
| 162 | 3CF.62 | Pattern end pointer | 8-bit | R/W |
| 163 | 3CF.63 | Line sign code | 8-bit | R/W |
| 164 | 83C0/93C0 | Line pattern byte 0 | 8-bit | R/W |
| 165 | 83C1/93C1 | Line pattern byte 1 | 8-bit | R/W |
| 166 | 83C2/93C2 | Line pattern byte 2 | 8-bit | R/W |
| 167 | 83C3/93C3 | Line pattern byte 3 | 8-bit | R/W |
| 168–169 | 3CF.64–65 | Line pixel count | 16-bit | R/W |
| 16C–16D | 3CF.66–67 | Line error term. | 16-bit | R/W |
| 170–171 | 3CF.68–69 | Line K1 constant | 16-bit | R/W |
| 174–175 | 3CF.6A–6B | Line K2 constant | 16-bit | R/W |

TABLE I-continued

MEMORY MAPPED REGISTERS

| MEM ADDR | IO ADDR | REGISTER | SIZE | R/W |
|---|---|---|---|---|
| 178–179 | 63C0-1/73xx | Line X0 | 16-bit | R/W |
| 17A–17B | 63C2-3/73xx | Line Y0 | 16-bit | R/W |
| 17C–17D | 83CC-D/93xx | Line X1 | 16-bit | R/W |
| 17E–17F | 83CE-F/93xx | Line Y1 | 16-bit | R/W |
| *BitBLT engine registers* | | | | |
| 1A0 | 33CA/53CA | Pattern register 0 | 8-bit | R/W |
| 1A1 | 33CB/53CB | Pattern register 1 | 8-bit | R/W |
| 1A2 | 33CC/53CC | Pattern register 2 | 8-bit | R/W |
| 1A3 | 33CD/53CD | Pattern register 3 | 8-bit | R/W |
| 1A4 | (33CA) | Pattern register 4 | 8-bit | R/W |
| 1A5 | (33CB) | Pattern register 5 | 8-bit | R/W |
| 1A6 | (33CC) | Pattern register 6 | 8-bit | R/W |
| 1A7 | (33CD) | Pattern register 7 | 8-bit | R/W |
| 1A8–1A9 | 23CA-B/43xx | BitBLT Source pitch | 16-bit | R/W |
| 1AA–1AB | 23CE-F/43xx | BitBLT Destination pitch | 16-bit | R/W |
| 1AC–1AD | 23C4-5/43Cx | Bitmap height | 16-bit | R/W |
| 1AE–1AF | 23C2-3/43Cx | Bitmap width | 16-bit | R/W |
| 1B0 | 33CE/53CE | Bitbit command 1 | 8-bit | R/W |
| 1B1 | 33CF/53CF | Bitbit command 2 | 8-bit | R/W |
| 1B8–1B9 | 63C0-1/73Cx | Bitbit source X0 | 16-bit | R/W |
| 1BA–1BB | 63C2-3/73Cx | Bitbit source Y0 | 16-bit | R/W |
| 1BC–1BD | 63CC-D/73Cx | Bitbit destination X1 | 16-bit | R/W |
| 1BE–1BF | 63CE/73CE | Bithit destination Y1 | 16-bit | R/W |
| *Miscellaneous registers* | | | | |
| 1F8 | None | FLASH PROM Register | 8-bit | R/W |
| 1FC–1FF | None | ORION Resvd Ctl Register | 32-bit | R/W |

The frame buffer 16 stores the pixel information which will be output to the display via the DAC 18. The size of the frame buffer may vary depending upon the maximum resolution and number of colors supported by the video controller 10. Table II provides the supported video modes for an exemplary video controller; however, other video modes could be used without departing from the present invention.

Each pixel is represented in the frame buffer 16 by one or more bits. The number of bits depends upon the number of colors supported. In monochrome mode (black and white), a single bit may represent each pixel. For sixteen-color operation, four bits are needed to represent each pixel. For true color operation (16.7 million colors), twenty-four bits are needed to represent each pixel. The number of pixels is determined by the resolution. Hence, for a resolution of 1024×768, the number of pixels represented in the frame buffer 16 numbers 786,432. In sixteen-color mode, therefore, 393,216 bytes of information would be needed in the frame buffer 16 to store the pixel information. Other information concerning operation of the controller 14 may also be stored in the frame buffer.

TABLE II

| | VIDEO MODES |
|---|---|
| RESOLUTION | BITS PER PIXEL SUPPORTED |
| 512 × 480 | 16, 32 |
| 640 × 400 | 16, 32 |
| 640 × 480 | 4, 8, 16, 32 |
| 800 × 600 | 4, 8, 16 |
| 1024 × 768 | 4, 8, 16 |
| 1280 × 1024 | 4, 8 |

As shown in FIG. 1, the controller 14 uses both memory-mapped registers 22 and I/O-mapped registers 24. In general, the memory-mapped registers are those registers which will be updated frequently by the processor during execution of the program. By using memory-mapped registers to store the most frequently changed video information, the speed of the computer system is greatly enhanced.

In the preferred embodiment, several options are provided for accessing the memory-mapped registers. In the first option, the memory-mapped registers may be assigned a 4K address space within the memory address space used for the frame buffer 16. While the number of registers shown in Table I do not require 4K bytes of memory, the 4K address space is reserved for future expansion. The addresses shown in Table I are offset from the address denoting the last 512 bytes of memory in the 4K register address space.

Preferably, the address space used for the frame buffer 16 is programmably located anywhere within the system memory extended ("high") address space, i.e., the memory space above 1M. Hence, for a ISA bus, the frame buffer address space may be located anywhere within the sixteen megabyte address space available. For an EISA bus system, the frame buffer 16 may be located anywhere within the four gigabyte address space. When the memory-mapped registers are mapped to an address space within the frame buffer address space, the register address space is set to the highest 4K block in the frame buffer address space as shown in FIG. 2.

The second option is to locate the memory-mapped register address space within conventional ("low") memory (the memory located below the one megabyte address boundary). There are a number of blocks of memory reserved between the 640K and one megabyte address boundaries for various systems in the computer. Preferably, the 4K buffer used for the memory-mapped register address space is located within the "option ROM" area in conventional memory. It is desirable that the memory-mapped registers not be mapped to the system ROM area (the address space reserved for the computer BIOS) or the video buffer area reserved for block switching to the frame buffer when a program cannot access the address space above one megabyte ("extended" memory).

The third option is to disable memory-mapping such that the memory-mapped registers can only be accessed through I/O-space. It should be noted that even when the registers are memory-mapped either to low or high memory, they can always be accessed through a corresponding I/O-space address.

In general, it is preferable to map the memory-mapped registers to the address space used for the frame buffer. In some cases, it may be necessary to map the memory-mapped register to low memory, in order to support programs which cannot access extended memory. Disabling the memory-mapped addressing of the register is provided for compatibility with the pre-existing programs.

In order to implement the present invention, a number of the registers 20 of controller 14 are used to define the address space and size of the frame buffer 16 and the location of the address space for the memory-mapped registers. The registers used in a specific implementation of the present invention are described below; however, it is understood that other register configurations may be used without departing from the invention.

Control Register2 provides two bits for address control. Bit 0 of Control Register2 is the "register memory-map control" bit. If this bit is set to "1", memory-mapping of the registers 22 is enabled. If this bit is set to "0", the memory-mapping of the registers is disabled. On power-up, bit 0 is set to "0". Bit 2 of Control Register2 is the "high-address memory-map control bit". If this bit is set to "1", the memory-mapped registers 22 are mapped "high", i.e., to the upper 4K address space of the frame buffer memory address space. If this bit is set to "0", then the memory-mapped registers 22 are mapped "low", i.e., to conventional memory. On power-up, this bit set to "0".

Control Register3 provides a bit for selecting the memory configuration mode and determining the location of the memory-mapped I/O registers, if enabled in high memory. Bit 0 of Control Register3 is the "memory mode select" bit. If this bit is set to "1", then the frame buffer 16 is in "2 Mbyte mode", wherein two megabytes of system address space in extended memory will be decoded for the frame buffer. The memory-mapped I/O registers (if enabled in high memory) will be at the last 512 bytes in the 2 Mbyte area. If the memory mode select bit is set to "0", then the frame buffer 16 is in "1 Mbyte mode", wherein only one megabyte of system address space is decoded in extended memory for the frame buffer. The memory-mapped I/O registers (if enabled in high memory) will be set to the last 512 bytes in the 1M area.

In order for the memory-mapped registers 22 to be mapped in the frame buffer address area as the last 512 bytes of the specified frame buffer (as determined by bit "0" of Control Register3), bit "2" and bit "0" of Control Register2 must both be set to "1" and the High Address Register (discussed hereinbelow) must contain a non-zero value. The High Address Register provides twelve bits (bits 11–0) which are compared to address bits 31–20 of the address on bus 12 to determine whether an address is located within the boundaries of the frame buffer 16. Hence, by setting bits 11–0 of the High Address Register to a desired value, the frame buffer may be located anywhere within the system memory address space above 1M. If the value in the High Address Register is not "0", the memory-mapped registers 22 may be mapped high.

A Memory-Map Base Register is provided for mapping the memory-mapped registers 22 to the address space below one megabyte. This register is decoded only when the high address memory-map control bit (bit 2 of Control Register2) is set to "0". The Memory-Map Base Register includes bits 6–0 which define a 4K block of system memory space in the low memory area where the memory-mapped I/O registers are to be located. The registers themselves are specifically located in the last 512 bytes of the 4K block. Exemplary offsets for the registers specified in Table I are based off the beginning of the 512 byte area (i.e., the 4K block address plus E00h).

When the memory-mapped registers are enabled for low memory, bits 6–0 of the Memory-Map Base Register are compared against address lines A18–A12. Address lines A31–A20 (EISA interface) or A23–A20 (ISA interface)

must be set to "0" and address line A19 must be set to "1" for low-mapped registers to be decoded. It should be noted that there are other requirements for the memory between 640K and one megabyte in a typical IBM-compatible computer system and the memory-mapped base register should be set accordingly in order to prevent conflicts. Also, it should be noted that if the memory-mapped registers are mapped in the video buffer address space accesses to the 4K block where the registers are mapped will prevent frame buffer accesses to the video buffer within that range (see FIG. 2).

It should be further noted that the memory-mapped registers 22 may be mapped low even though the frame buffer 16 is mapped high using the High Address Register.

FIG. 3 illustrates a block diagram of the portion of the controller 14 used to decode addresses on the bus 12 to determine whether the address corresponds to a memory-mapped register 22. The decoder section 50 comprises memory-mapped register decode logic 52, frame buffer decode logic 54 and I/O-mapped register decode logic 56. Memory-mapped register decode logic 52 and frame buffer decode logic 54 are coupled to registers 20 (specifically Control Register2 and Control Register3, the High Address Register and the Memory-Map Base Register). The frame buffer decode logic 54 outputs a signal FB__SEL which indicates whether an address is in the frame buffer's address space. The memory-mapped register 52 outputs a signal indicating which of the memory-mapped registers 22 is selected responsive to an address specifying one of the memory-mapped registers 22. The I/O-mapped register decode logic 56 outputs a signal I/O__REG__SEL specifying the address of a register responsive to an address in I/O-space.

The frame buffer decode logic 54 sets FB__SEL to a "1" if the address on the bus 12 is set to an address within the address space of the frame buffer (i.e., bits 11–0 of the High Address Register=address bits 31–20) and the M/IO# bit is set to "1". If FB__SEL is set to "1", the memory-mapped register decode logic determines whether the address within the frame buffer address space is in the 4K address space reserved for the memory-mapped registers 22. If so, the address of the selected register is output. Similarly, if the high address memory-map control bit (bit 2 of Control Register2) indicates that the memory-mapped registers are mapped low and if the SMEM__READ or SMEM__WRITE signal is low (indicating-a read/write to low memory), then the memory-mapped register decode logic 52 determines whether the address is within the 4K block of system space in the low memory area defined by the Memory-Map Base Register.

If M/IO# is set to "0", the memory-mapped register decode logic 52 and the frame buffer decode logic 54 are disabled, and the I/O-mapped register decode logic 56 determines whether the I/O-space address is within the area reserved for the video controller 10 and generates the address of a register 20 responsive thereto.

As can be seen in FIG. 3, the decode logic 50 takes advantage of the frame buffer decode logic 54 which is normally available in a video controller 10 to determine whether an address is directed to the frame buffer 16. Hence, the only hardware addition is the memory-mapped register decode logic 52 and certain control bits and registers used to support the memory-mapping.

Although the preferred embodiment of the invention has been described in detail, it should be noted that various changes, substitutions and alterations could be made herein without departing from the spirit and scope of the invention as defined by the appended claims.

What is claimed is:

1. A video controller comprising:
   a video memory;
   a first set of registers for storing control information;
   a second set of registers for defining:
   a first address space for said video memory in high memory;
   a second address space for addressing said first set of registers in low memory addresses using memory mapped addresses;
   whether memory mapping is used to address said first set of registers; and
   whether memory mapping, if used, directs addresses to low memory or high memory; and
   decode logic coupled to said first set of registers and said second set of registers, comprising:
   circuitry to identify memory mapped addresses directed to said first set of registers; and
   circuitry to identify I/O mapped addresses directed to said first set of registers.

2. The video controller of claim 1 wherein said circuitry to identify memory mapped addresses includes circuitry to identify memory mapped addresses within a predetermined portion of said first address space.

3. The video controller of claim 2 wherein said circuitry to identify memory mapped addresses further includes circuitry for identifying one of said first set of registers in response to a memory mapped address within said predetermined portion of said first address space.

4. A method of storing display information in a video controller comprising the steps of:
   transferring data to a video memory responsive to control information in a first set of registers;
   defining in a second set of registers:
   a first address space for said video memory in high memory;
   a second address space for addressing said first set of registers in low memory addresses using memory mapped addresses;
   whether memory mapping is used to address said first set .Of registers; and
   whether memory mapping, if used, directs addresses to low memory or high memory; and
   responsive to said second set of registers:
   identifying memory mapped addresses directed to said first set of registers and
   identifying I/O mapped addresses directed to said first set of registers.

5. The method of claim 4 wherein said step of identifying memory mapped addresses includes the step of identifying memory mapped addresses within a predetermined portion of said first address space.

6. The method of claim 5 wherein said step of identifying memory mapped addresses further includes the step of identifying one of said first set of registers in response to a memory mapped address within said predetermined portion of said first address space.

\* \* \* \* \*

UNITED STATES PATENT AND TRADEMARK OFFICE
CERTIFICATE OF CORRECTION

PATENT NO. : 5,506,953
DATED : April 9, 1996
INVENTOR(S) : Giang H. Dao

It is certified that error appears in the above-indentified patent and that said Letters Patent is hereby corrected as shown below:

Col. 3, ln. 56, delete "Line_drawing", insert --Line-drawing--.

Col. 3, ln. 62, delete "83C193C1", insert --83C1/93C1--.

Col. 4, ln. 39, delete "Bithit", insert --Bitbit--.

Col. 8, ln. 46, delete "set .Of", insert --set of--.

Signed and Sealed this

Thirtieth Day of July, 1996

BRUCE LEHMAN

Attest:

Attesting Officer

Commissioner of Patents and Trademarks